Nov. 20, 1923.  1,474,561

F. J. SONNEKES

RELIEF AND TRANSPARENCY OF PLASTIC MATERIAL

Filed March 16, 1922

Inventor:
Frederick J. Sonnekes
by  J. J. Geisler
Atty.

Patented Nov. 20, 1923.

1,474,561

UNITED STATES PATENT OFFICE.

FREDERICK J. SONNEKES, OF PORTLAND, OREGON, ASSIGNOR TO EVERETT P. BABCOCK, OF PORTLAND, OREGON.

RELIEF AND TRANSPARENCY OF PLASTIC MATERIAL.

Application filed March 16, 1922. Serial No. 544,305.

*To all whom it may concern:*

Be it known that I, FREDERICK J. SONNEKES, a citizen of the Republic of Germany, and a resident of Portland, county of Multnomah, and State of Oregon, have invented a certain new and useful Improvement in Reliefs and Transparencies of Plastic Material, of which the following is a specification.

The primary object of my invention is to provide a simple method for reliefs and transparencies of a plastic material.

As well known, in decorations such as certain art glass windows and translucent light shades, the lights and shadows composing the picture are produced by the variation in thickness of the material used. Artists have used glass, and other vitreous compounds for windows, the material being either molded or ground, to produce the variations in thickness. Molds used for these purposes must be made very exact, and of a very substantial material, because the material used is put in hot. This makes the process very expensive except when many replicas of the same design are molded.

Plastic material which sets cold has heretofore presented difficulties when used for making reliefs and transparencies because it does not have the necessery inherent tenacity, and thus the thin surfaces had a tendency to crack.

I have discovered that if both sides of the plastic mass is covered with a skin or thin sheet of more or less tenacious flexible, semi-absorbent material, such for example as thin paper, such material has the property of absorbing and becoming impregnated with some of the moisture of the plastic mass and thus accommodates itself to the contractions of the latter while drying out, and it holds the plastic mass together against lineal stresses and separation thus preventing cracking. By way of a theoretical explanation it may be said that the encasing of the plastic mass, is somewhat analogous to reinforcing concrete, with respect to which it is known that a very small percentage of the reinforcing material serves efficiently to neutralize lineal stresses.

In practice I have successfully used thin sheets of tenacious grades of paper for covering the plastic mass, since paper readily becomes translucent if oiled. Thin sheets of fabric may also successfully be used.

My process of making a plastic relief or transparency consists in placing a quantity of plastic material between two sheets of tenacious, flexible material.

This material should be of a semi-absorbent nature so that it will adhere to the plastic material, and thus produce a unitary body. This body is then placed in a press, and the plastic material is compressed into the recesses inscribed in the mold. The preferable method of producing distinct and clear cut impressions is to cause the pressure to be applied to the said unitary body thru the medium of a convexed resilient surface which causes the material to be first compressed in the center and then gradually applies the pressure towards the edges. Experimentation has shown that this method produces more clean cut impressions; and furthermore compresses the edges of the configuration to a minimum fin like thickness which can then be easily broken away from the configuration itself.

Any desired impression may be inscribed in an intaglio die, and the impression made with this die will leave the desired configuration as bas-relief in the impressed form.

Furthermore, my process may also be successfully used for producing embossed surfaces. In this case two corresponding dies are used, one being the counterpart of the other, and thus producing a configuration of uniform thickness thruout.

Configurations which are to be used for transparencies or reliefs which are made by a single intaglio die and a flat bed plate will produce heavier and lighter cross sections according to the recesses of the mold.

I have diagrammatically illustrated my method in the accompanying drawings, in which.

Figure 1:
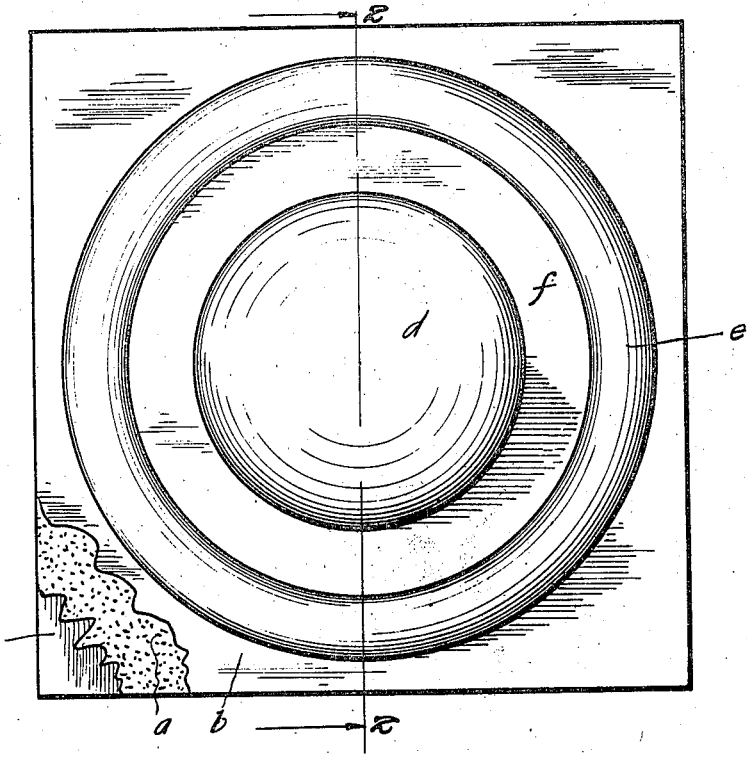
Fig. 1 is a plan view of a symmetrical configuration embodying my invention.
Figure 3:
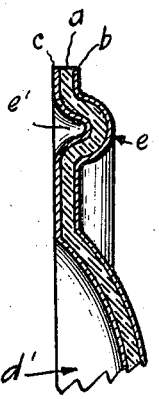
Fig. 3 is a fragmentary sectional view showing how my invention can be used to produce configurations with a uniform thickness thruout.
Figure 4:
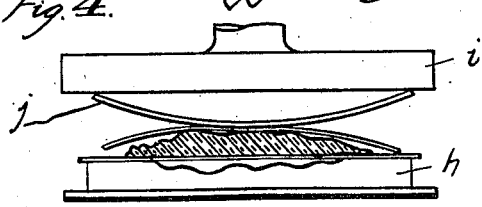
Fig. 4 is a diagrammatic representation of the preferred method of forming the configurations, namely, using a flat surface, formed of a convexed resilient member.
Figure 5:
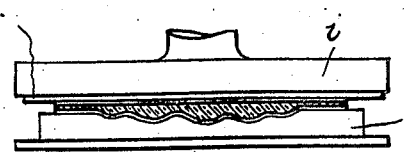
Fig. 5 is a similar diagrammatic representation except that pressure has been applied and the resilient surface has been flattened out to conform to the surface of the bed plate.
Figure 6:
Fig. 6 is a fragmentary detail showing how the fins left around the edges of the configuration are compressed very thin and may be broken off easily.
Figure 2:
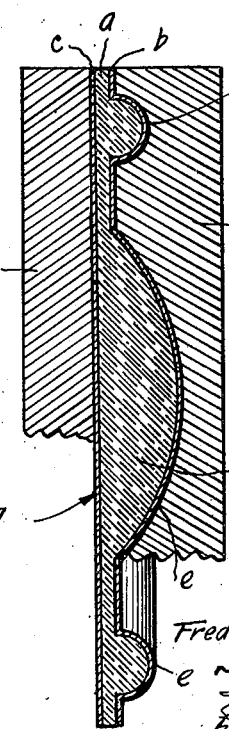
Fig. 2 is a sectional view taken on the line 2—2 of Fig. 1 and shows a fragment of the molds used for obtaining a configuration shown in Fig. 1.

*a* is a configuration formed of plastic material, *b* is a piece of tenacious material forming the upper surface of said configuration, *c* being a similar piece of material forming the lower surface. The configuration is formed with a circular portion *d* shaped as a segment of a sphere. *e* is a raised portion of a ring. *f* is the plane upon which the raised portions *d* and *e* are superimposed. The bottom surface of the plastic material *b* may be made either flat as *g* or else with hollow portions, the contour of which corresponds to the upper surface of the transparency such as *e'* and *d'*. These transparencies may be made with an intaglio mold *h* and a flat surface *i* or else by one intaglio and one cameo die, the configurations on each being the counterpart of each other.

A convexed resilient surface *j* may be interposed between the flat surface *i* and the plastic mass so that when pressure is applied the pressure is first caused to act on the central part of the plastic mass and cause the plastic material to be forced to the edges thus filling every recess and forcing the excess material away from the configuration.

The tenacious flexible material used as the exterior covering permits slight flexure of the material without apparent cracking of the form of the plastic material. The amount of flexure allowed of course is limited by the tensile strength of the material used.

One example of the plastic material which can be used in my transparency is, a mixture of gelatine, water, syrup, and lubricating oil of approximately equal parts, mixed with a small amount of gum arabic and glycerine. This mixture can be thickened to a paste with corn starch and will appear translucent when held to the light.

I claim:

1. A transparency of the character described, comprising two thin sheets of tenacious, translucent material, constituting the outer faces of the transparency, and a layer of translucent plastic material between said sheets, forming thereby a unitary, translucent body, the body being impressed to form the relief surfaces producing the design represented by the transparency.

2. A transparency of the character described, comprising two thin sheets of tenacious, semi-absorbent translucent material, constituting the outer faces of the transparency, and a layer of translucent plastic material between said sheets, forming thereby a unitary, translucent body, the body being impressed to form the relief surfaces producing the design represented by the transparency.

3. A transparency of the character described, comprising two sheets of translucent, tenacious paper, constituting the outer faces of said transparency, and a layer of translucent plastic material between said sheets, forming thereby a unitary translucent body, the body being impressed to form the relief surfaces producing the design represented by the transparency.

FREDERICK J. SONNEKES.